United States Patent
Choi

(10) Patent No.: US 7,641,227 B2
(45) Date of Patent: Jan. 5, 2010

(54) DYNAMIC RAMP APPARATUS FOR CURTAIN AIRBAG IN AUTOMOBILE

(75) Inventor: Jae Ho Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 214 days.

(21) Appl. No.: 11/648,889

(22) Filed: Dec. 29, 2006

(65) Prior Publication Data

US 2008/0106082 A1  May 8, 2008

(30) Foreign Application Priority Data

Nov. 7, 2006  (KR) .................. 10-2006-0109678

(51) Int. Cl.
*B60R 21/213* (2006.01)
(52) U.S. Cl. .................. 280/730.2; 280/743.2
(58) Field of Classification Search ............. 280/728.3, 280/730.2, 743.1, 743.2
See application file for complete search history.

(56) References Cited

U.S. PATENT DOCUMENTS

| | | | | |
|---|---|---|---|---|
| 2,806,737 A | * | 9/1957 | Maxwell ...................... 280/734 |
| 5,265,903 A | * | 11/1993 | Kuretake et al. ........... 280/730.2 |
| 5,975,566 A | * | 11/1999 | Bocker et al. .............. 280/730.2 |
| 6,102,436 A | * | 8/2000 | Bayley et al. ................ 280/753 |
| 6,149,195 A | * | 11/2000 | Faigle ......................... 280/749 |
| 6,152,482 A | * | 11/2000 | Patel et al. ................ 280/730.2 |
| 6,168,194 B1 | * | 1/2001 | Cuevas et al. ............. 280/730.2 |
| 6,224,087 B1 | * | 5/2001 | Stutz et al. ................ 280/728.2 |
| 6,565,116 B1 | * | 5/2003 | Tajima et al. ............. 280/730.2 |
| 6,913,280 B2 | * | 7/2005 | Dominissini et al. ...... 280/728.2 |
| 7,273,228 B2 | * | 9/2007 | Noguchi et al. ........... 280/730.2 |
| 7,338,071 B2 | * | 3/2008 | Noguchi et al. ........... 280/730.2 |
| 7,347,447 B2 | * | 3/2008 | Nakanishi ................. 280/730.2 |
| 2005/0140124 A1 | * | 6/2005 | Noguchi et al. ........... 280/730.2 |
| 2007/0046000 A1 | * | 3/2007 | Sato et al. ................. 280/730.2 |
| 2007/0096440 A1 | * | 5/2007 | Purvis et al. .............. 280/728.3 |
| 2008/0111354 A1 | * | 5/2008 | Ryu ......................... 280/730.2 |

FOREIGN PATENT DOCUMENTS

| | | |
|---|---|---|
| JP | 05-193430 | 8/1993 |
| JP | 2001-246989 | 9/2001 |
| JP | 2003-081048 | 3/2003 |
| JP | 2005-178608 | 7/2005 |

(Continued)

*Primary Examiner*—Paul N Dickson
*Assistant Examiner*—Laura Freedman
(74) *Attorney, Agent, or Firm*—Morgan, Lewis & Bockius LLP

(57) ABSTRACT

An expansion guiding apparatus of an airbag includes a connector connected to the airbag and to a pillar trim. When the airbag expands, it pulls the connector, which folds the pillar trim. The connector may include direction-change pins and a wire extending from the airbag to the direction-change pins to the pillar trim, sequentially, and attached to the airbag and the pillar trim. The wire may include a hook with a notch, attaching the wire to the pillar trim. Alternatively, the connector may include a rotating bar, rotatable about a hinge on the inner panel, and a wire extending from the airbag to the rotating bar to the pillar trim, sequentially, and attached to the airbag and the pillar trim. The wire may include a hook with a notch, attaching the wire to the rotating bar. The pillar trim may include a hinge, a notch, or a soft material part.

10 Claims, 3 Drawing Sheets

FOREIGN PATENT DOCUMENTS

| KR | 2002-0029759 |   | 4/2002 |
| KR | 2003015021 A | * | 2/2003 |
| KR | 2004035045 A | * | 4/2004 |
| KR | 10-0461067 |   | 6/2004 |
| KR | 2005070592 A | * | 7/2005 |
| WO | WO 01/15941 |   | 3/2001 |

* cited by examiner

DYNAMIC RAMP APPARATUS FOR CURTAIN AIRBAG IN AUTOMOBILE

CROSS-REFERENCE TO RELATED APPLICATIONS

This application claims the benefit of Korean Patent Application No. 10-2006-0109678, filed on Nov. 7, 2006, in the Korean Intellectual Property Office, the disclosure of which is incorporated herein by reference.

BACKGROUND

1. Field of the Invention

The present invention relates to an expansion guiding apparatus of a curtain airbag for an automobile, and more particularly, to an expansion guiding apparatus in which an airbag cushion is not caught in a pillar trim of a center pillar when the curtain airbag is expanded.

2. Description of the Related Art

A pillar forms a doorframe, and is generally divided into a front pillar, a center pillar and a rear pillar. A decorative pillar trim is attached to the surface of the pillar facing the passenger compartment. A curtain airbag may be caught between the center pillar and the pillar trim when the airbag expands.

A lamp bracket is provided as an expansion guiding apparatus for preventing the curtain airbag from being caught and guiding the expansion direction of the airbag. However, the lamp bracket is typically formed of a rigid metal, so it does not deform by expansion pressure. Its impact absorption is therefore low. Furthermore, the airbag cushion may break the pillar trim, and since the pillar trim is typically made of a metal, the broken pillar trim can be a murderous weapon.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an expansion guiding apparatus of a curtain airbag with a wire connector, one side of which is connected to an airbag cushion, and the other side of which is connected to a center pillar trim, mounted in a pillar section under a curtain airbag, which is mounted at a joint of a headlining with the center pillar trim. In a side impact crash, the pillar trim is folded inward by a pulling force of the connector due to the expansion of the airbag cushion and the airbag cushion is expanded in a correct direction, thereby preventing the curtain airbag from being caught in the center pillar trim.

Embodiments of the present invention provide an expansion guiding apparatus of a curtain airbag for an automobile, comprising: a connector having a direction-change function, one side of which is connected to an airbag and the other side of which is connected to a pillar trim of a center pillar, in order to fold the pillar trim by an operating force of the airbag cushion and to guide the correct expansion direction of the airbag cushion when the airbag cushion of the curtain airbag is expanded.

According to an exemplary embodiment, the connector comprises first and second direction-change pins, mounted on an inner panel, and a wire, extending between the airbag, both direction-change pins, and the pillar trim.

According to another exemplary embodiment, the connector comprises a rotating bar, which is rotated about a hinge on an inner panel, and a wire, extending between the airbag, the rotating bar, and the pillar trim.

The pillar trim is folded in a hinge type by providing a hinge at the lower portion thereof, in a notch type by providing a notch part at the lower portion thereof, or in a folding type by providing a soft material part at the lower portion thereof, in order to be folded readily into a pillar section by the operation of the wires.

Moreover, the wire has a hook-shaped fixing member with a notch part formed thereon so that the wire can be readily removed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Hereinafter, the present invention will be described in detail with reference to the accompanying drawings.

Exemplary embodiments of the present invention provide a curtain airbag 7 mounted at a joint of a headlining 5 and a pillar trim 3 of a center pillar, a wire connector 10, one side of which is connected to the airbag 7 and the other side of which is connected to the center pillar trim 3, is mounted in a pillar section under the curtain airbag 7. In a side impact crash, the pillar trim 3 is folded inward by the connector 10 due to the expansion of the airbag 7 and the airbag 7 expands in the correct direction.

Figure 1:
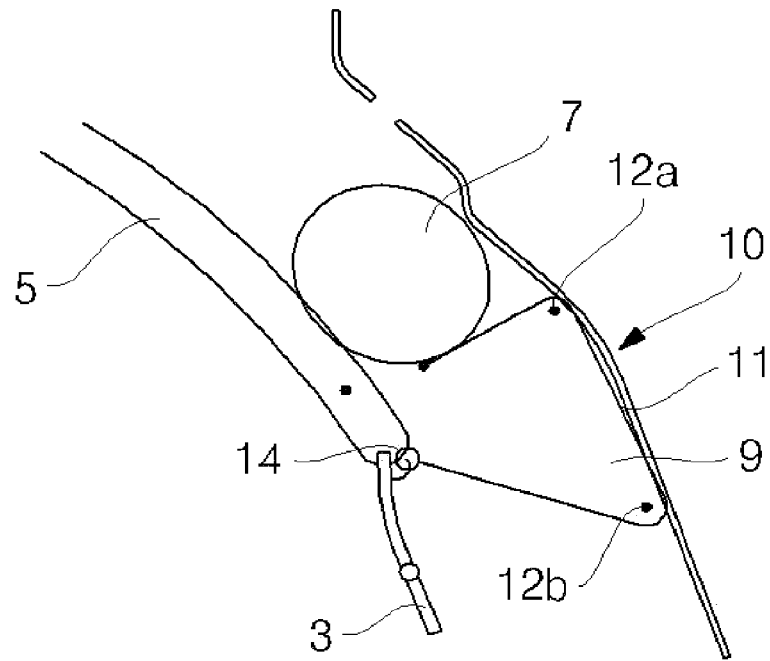
FIG. 1 is a side view showing an embodiment of an expansion guiding apparatus of a curtain airbag for an automobile according to the present invention.

As shown in FIG. 1, the connector 10 includes a wire 11 connected to the airbag 7 and the pillar trim 3. A plurality of direction-change pins 12a and 12b, are spaced from each other on the inner panel side, behind the airbag 7.

The wire 11 extends between the inner panel 9, the airbag 7, a first direction-change pin 12a, a second direction-change pin 12b, and a fixing member 14 on the upper portion of the pillar trim 3.

Accordingly, when the airbag 7 expands, a tensile force is applied to the wire 11, pulling the pillar trim 3 into the pillar section and guiding expansion of the airbag 7.

Figure 2:
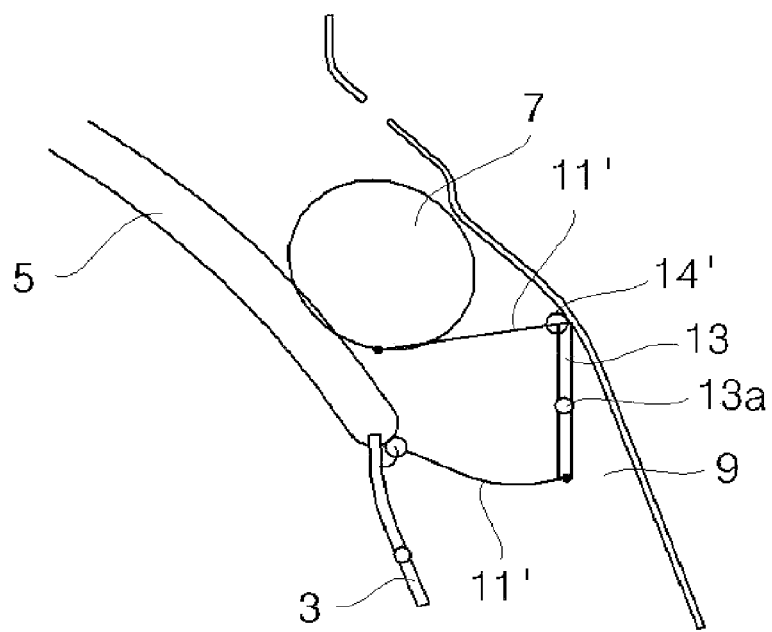
FIG. 2 is a side view showing another embodiment of an expansion guiding apparatus of a curtain airbag for an automobile according to the present invention.

Meanwhile, FIG. 2 shows another embodiment, in which the connector 10 includes a wire 11'. A rotating bar 13 rotating about a hinge 13a is further provided.

The hinge 13a is disposed near the rear of the curtain airbag 7 and fixed to an inner panel 9. The wire 11' extends between the airbag 7 and a fixing member 14' in the upper portion of the rotating bar 13.

Accordingly, when the airbag 7 expands, the rotating bar 13 rotates in the expansion direction, at the same time, the wire 11' on the bottom end of the rotating bar 13 is pulled inward and the pillar trim 3 is folded into the pillar section, and the expansion of the airbag 7 is guided.

Figure 3:
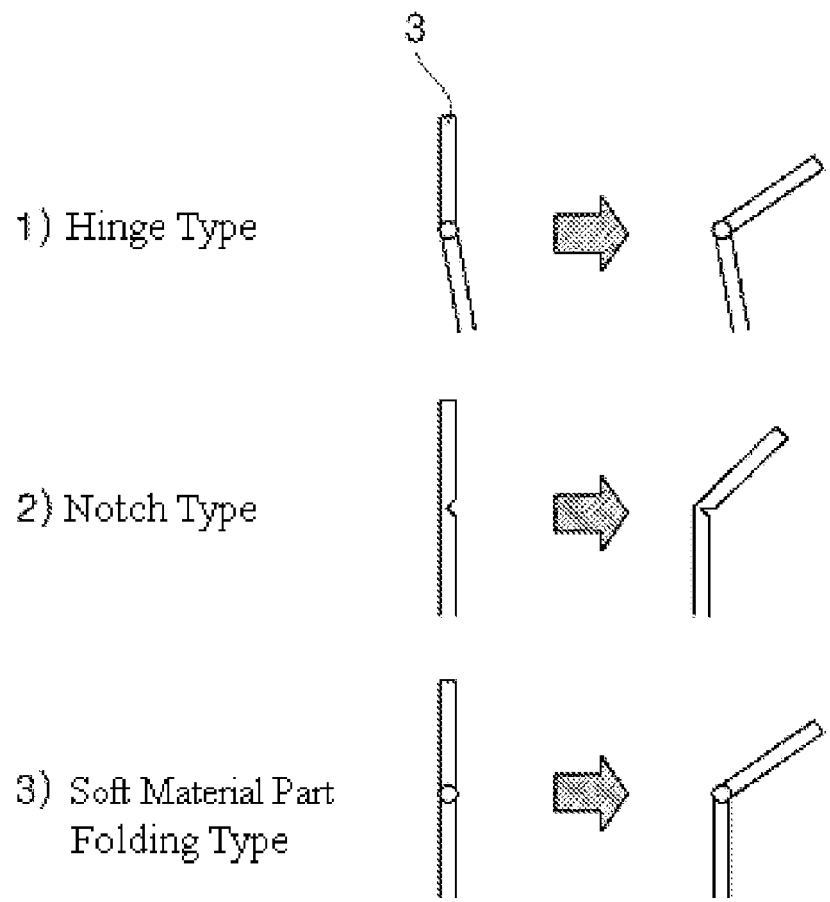
FIG. 3 shows a pillar trim structure of an expansion guiding apparatus of a curtain airbag for an automobile according to an embodiment of the present invention.

Referring to FIG. 3, to fold the pillar trim 3, the pillar trim 3 is formed in a hinge type by providing a hinge at the lower portion thereof, in a notch type by providing a notch part at the lower portion thereof or in a folding type by providing a soft material part at the lower portion thereof.

Figures 4A, 4B:
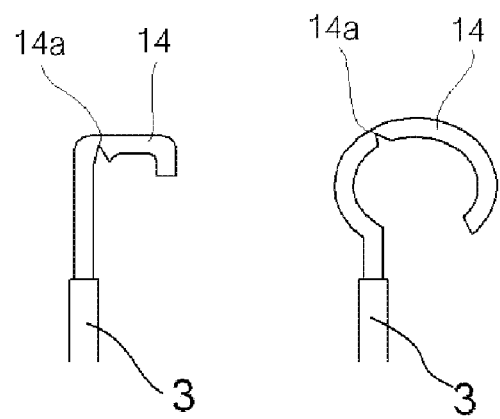
FIGS. 4A and 4B show the wire removal structure according to an embodiment of the present invention.

Meanwhile, as shown in FIG. 1, when the curtain airbag 7 expands and the wire 11 is pulled in the expansion direction, the fixing member 14 is removed from the upper portion of the pillar trim 3. The fixing member 14 may have a shape of a hook with a notch part 14a formed on the inside thereof so as to readily remove the wire 11 as shown in FIGS. 4A and 4B.

Furthermore, as shown in FIG. 2, when the curtain airbag 7 expands and the wire 11' is pulled in the expansion direction, the fixing member 14' is removed from the rotating bar 13, and thus the fixing member 14' may have a shape of a hook with a notch part 14a formed on the inside thereof so as to readily remove the wire 11'.

The operating states of the expansion guiding apparatus according to embodiments of the present invention will be explained with reference to FIGS. 5 and 6.

Figure 5:
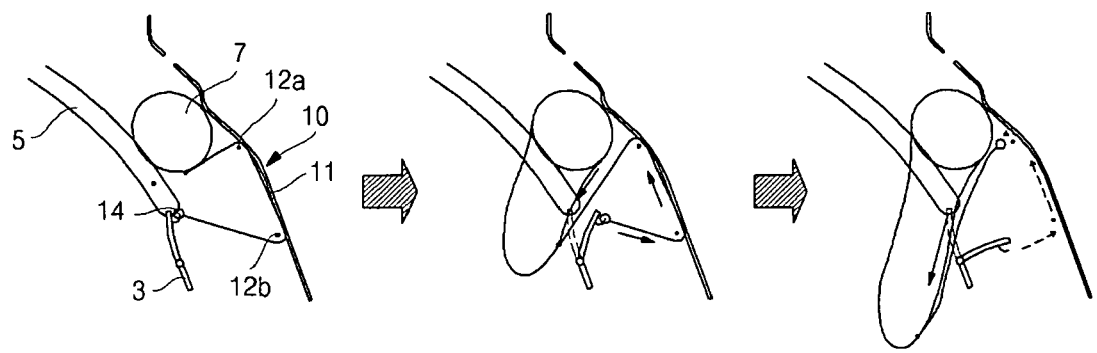
FIG. 5 shows the operating states of an embodiment of the present invention.

In a first embodiment, shown in FIG. 5, when a side impact occurs an airbag control unit (not shown) inflates the curtain airbag 7. The wires 11 and 11' connected to the airbag 7 pull the pillar trim 3 of the center pillar into the trim section.

Thereafter, the pillar trim 3 folds, and then the fixing member 14 folds and the wire 11 is removed, and thus the airbag 7 is completely expanded.

Figure 6:
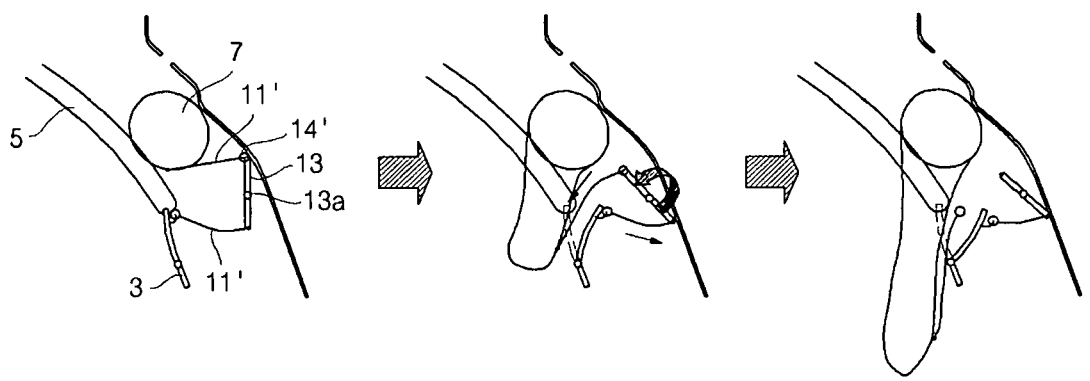
FIG. 6 shows the operating states of another embodiment of the present invention.

Furthermore, according to another embodiment shown in FIG. 6, the wire 11' rotates the rotating bar 13 about the hinge 13a and pulls the pillar trim 3 into the trim section.

Thereafter, the pillar trim 3 folds, and then the fixing member 14' is removed from the rotating bar 13, and thus the airbag 7 is completely expanded.

Although preferred embodiments of the present invention have been described for illustrative purposes, those skilled in the art will appreciate that various modifications and changes thereof are possible without departing from the scope and spirit of the present invention, and all modifications and changes are intended to be included within the description of the claims.

What is claimed is:

1. An expansion guiding apparatus of an airbag, comprising:
    a pillar trim; and
    a connector comprising a first side configured to be connected to the airbag and a second side configured to be connected to the pillar trim;
    wherein when the airbag expands, the airbag pulls the connector, which folds the pillar trim, and
    wherein the connector comprises at least one direction-change pin mounted on an inner panel, and a wire extending from the airbag around the at least one direction-change pin to the pillar trim sequentially so that the airbag and the pillar trim are attached by the connector.

2. The expansion guiding apparatus as claimed in claim 1, wherein the wire comprises a hook-shaped fixing member comprising a notch, attaching the wire to the pillar trim.

3. The expansion guiding apparatus as claimed in claim 1, wherein the pillar trim comprises a hinge.

4. The expansion guiding apparatus as claimed in claim 1, wherein the pillar trim comprises a notch.

5. The expansion guiding apparatus as claimed in claim 1, wherein the pillar trim comprises a soft material part.

6. An expansion guiding apparatus of an airbag, comprising:
    a pillar trim; and
    a connector comprising a first side configured to be connected to the airbag and a second side configured to be connected to the pillar trim;
    wherein when the airbag expands, the airbag pulls the connector, which folds the pillar trim, and
    wherein the connector comprises a rotating bar, rotatable about a hinge mounted on an inner panel, and a wire extending from the airbag to the rotating bar to the pillar trim, sequentially so that the airbag and the pillar trim are attached by the connector.

7. The expansion guiding apparatus as claimed in claim 6, wherein the wire comprises a hook-shaped fixing member comprising a notch, attaching the wire to rotating bar.

8. The expansion guiding apparatus as claimed in claim 6, wherein the pillar trim comprises a hinge.

9. The expansion guiding apparatus as claimed in claim 6, wherein the pillar trim comprises a notch.

10. The expansion guiding apparatus as claimed in claim 6, wherein the pillar trim comprises a soft material part.

\* \* \* \* \*